United States Patent
Kwon et al.

(10) Patent No.: US 8,944,605 B2
(45) Date of Patent: Feb. 3, 2015

(54) LASER PROJECTOR AND METHOD OF PROCESSING SIGNAL THEREOF

(75) Inventors: Jaewook Kwon, Seoul (KR); Junghwan Choi, Seoul (KR); Junghoon Seo, Seoul (KR); Chanyoung Yoon, Seoul (KR); Yongki Kim, Seoul (KR); Sangkeun Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 13/402,169

(22) Filed: Feb. 22, 2012

(65) Prior Publication Data
US 2012/0218525 A1 Aug. 30, 2012

(30) Foreign Application Priority Data
Feb. 25, 2011 (KR) .................. 10-2011-0017113

(51) Int. Cl.
*G03B 31/00* (2006.01)
*H04N 9/31* (2006.01)

(52) U.S. Cl.
CPC .................................. *H04N 9/3135* (2013.01)
USPC .................. 353/31; 353/30; 353/85; 353/94; 353/121; 359/385; 359/472; 348/742; 348/771

(58) Field of Classification Search
USPC ............ 353/30, 31, 79, 85, 94, 99, 121, 122; 359/223.1, 224.1, 225.1, 237, 385, 359/472, 726, 872; 348/742, 743–747, 771; 349/5, 7–9
See application file for complete search history.

(56) References Cited

U.S. PATENT DOCUMENTS

| | | | | |
|---|---|---|---|---|
| 7,404,644 B2 * | 7/2008 | Evans et al. | ..................... | 353/31 |
| 7,808,577 B2 * | 10/2010 | Kimura | ........................ | 349/65 |
| 7,959,305 B2 * | 6/2011 | Destain | ........................ | 353/99 |
| 8,218,216 B2 * | 7/2012 | Konno et al. | .............. | 359/202.1 |
| 8,232,957 B2 * | 7/2012 | Hajjar et al. | ................. | 345/102 |
| 2007/0268458 A1 * | 11/2007 | Lee et al. | ....................... | 353/31 |
| 2009/0096994 A1 * | 4/2009 | Smits | ............................ | 353/30 |
| 2009/0161075 A1 | 6/2009 | Gollier | | |
| 2010/0177253 A1 * | 7/2010 | Golub | ............................. | 349/8 |

FOREIGN PATENT DOCUMENTS

| CN | 101263422 | 9/2008 |
|---|---|---|
| CN | 101517482 | 8/2009 |

OTHER PUBLICATIONS

Chinese Office Action and Search Report for Application 201210046358.9 dated Dec. 19, 2013 and English translation.
Chinese Office Action dated Jul. 11, 2014 for Application 201210046358.9 and English language translation.

* cited by examiner

*Primary Examiner* — Sultan Chowdhury
(74) *Attorney, Agent, or Firm* — KED & Associates LLP (57) ABSTRACT

There is disclosed a laser projector and a method of processing a signal thereof. The laser projector includes a plurality of laser sources configured to generate lasers, a controller configured to control each of the generated lasers to be incident on a specific region of a screen with a time difference, and a scanner configured to scan each of the lasers on the screen.

16 Claims, 12 Drawing Sheets

LASER PROJECTOR AND METHOD OF PROCESSING SIGNAL THEREOF

CROSS-REFERENCE TO RELATED APPLICATION

This application claims priority under 35 U.S.C. §119 from Korean Application No. 10-2011-0017113 filed on Feb. 25, 2011, the subject matter of which is incorporated herein by reference.

BACKGROUND

1. Field

Embodiments of the invention may relate to a laser projector, more particularly, to a laser projector using a scanner and a method of processing a signal thereof.

2. Background

Generally, a laser projector is a system that displays an image by projecting an input image signal, using a laser beam emitted from a laser source. Such a laser projector is usually used for presentation in a conference room, a projector in a theater and a home theater.

The laser projector may include a laser source, an optical modulator, an optical system, an optical scanner and an image controller.

In this instance, the laser source includes a red laser for generating a red laser, a green laser for generating a green laser and a blue laser for generating a blue laser.

The laser source emits the generated laser to the optical modulator. The laser modulator modulates the incident laser based on an image control signal of the image controller to generate a diffraction light and it emits the generated diffraction light to the optical system.

Hence, the generated diffraction light is transmitted to the optical scanner via the optical system and the optical scanner scans the light to display an image, while mirrors are rotating a preset angle according to a mirror control signal of the image controller.

SUMMARY

Accordingly, the embodiments may be directed to a laser projector and a method of processing a signal thereof. To solve the problems, an object of the embodiments may be to provide a laser projector capable of improving brightness by compensating the brightness within a range enabling human eyes, and a method of processing a signal thereof.

To achieve these objects and other advantages and in accordance with the purpose of the embodiments, as embodied and broadly described herein, a laser projector includes a plurality of laser sources configured to generate lasers; a controller configured to control each of the generated lasers to be incident on a specific region of a screen with a time difference; and a scanner configured to scan each of the lasers on the screen.

The controller differentially may control a separation angle of each laser source to enable each generated laser to be incident with a time difference.

The controller may determine a separation angle of each laser source at which the quantity of scanned lasers is the largest in a preset period.

The controller may control a laser projecting angle between two neighboring laser sources with respect to the scanner to be in a range of (A tan(0.07)/10 to (A tan(0.07))*2.

The controller may control each scanned laser to be output a real image only to an overlapped region on a screen.

The controller may differentially control an active period corresponding to the overlapped region based on the separation angle of each laser source.

The controller may control a start time of the active period of the laser scanned on the screen earliest to be the last and a start time of the active period of the laser scanned last to be the earliest.

The controller may control the size of an image on the screen based on the separation angle of each laser source and the active period.

The controller may control the output image by a preset period and the preset period comprises a frame period.

The laser projector may further include a memory configured to store an image signal for a corresponding laser based on the active period; and an image processor configured to process the image signal.

In another aspect of the invention, a method of processing a signal of a laser projector includes (a) generating lasers in a plurality of laser sources; and (b) scanning a laser generated in each laser source on a screen The step of (b) may include a step of controlling each laser to be incident on a specific region on the screen with a time difference.

The controlling step may differentially control a separation angle of each laser source to generate the time difference.

The controlling step may determine a separation angle of each laser source at which the quantity of lasers scanned in a preset period is the largest.

The separation angle of each laser source may be a laser projecting angle between two neighboring laser sources with respect to the scanner comprising a range of (A tan(0.07))/10 to (A tan(0.07))*2.

The step of (b) may further include a step of controlling each scanned laser to output a real image only to an overlapped region on the screen.

The image output controlling step may control an active period corresponding to the overlapped region differentially based on the separation angle of each laser source.

The image output controlling step may control a start time of the active period of the laser scanned on the screen earliest to be the last and a start time of the active period of the laser scanned last to be the earliest.

The image output controlling step may control the size of the image scanned on the screen based on the separation angle of each laser source and the active period.

The image output controlling step may control the output image by a preset period of the output image and the preset period comprises a frame period.

The step of (b) may further include a step of temporarily storing an image signal for a corresponding laser based on the active period; and a step of processing the image signal.

The embodiments of the invention have following advantageous effects.

First, brightness is compensated within a range enabling eye safety and the brightness is improved, with satisfying Class required by eye safety standards. As a result, the limit set on the brightness of the conventional laser projector may be improved effectively.

Second, user satisfaction may be enhanced effectively.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments of the invention may be described in detail with reference to the following drawings in which like reference numerals refer to like elements and wherein.

DETAILED DESCRIPTION

Reference may now be made in detail to specific embodiments of the invention, examples of which may be illustrated in the accompanying drawings. Wherever possible, same reference numbers may be used throughout the drawings to refer to the same or like parts.

The invention relates to technology for improving brightness of a laser protector within a range enabling eye safety in a protector using laser and a scanner or a scanning type laser protector.

A product using a laser is required to comply with safety regulations with respect to a laser when a laser reaches a human body.

Especially, eye safety can be issued because of laser beam projected from a laser projector relating to the invention. Accordingly, strict standards for eye safety are provided and the standards are different from country to country. For example, there is KS C IEC 60825 in Korea to set a limit on every product. There are similar regulations in other countries. It is enacted in such regulations that a product should pass laser safety inspections for selling related products in every country (for example, IEC 60825, ANSIZ136).

Related to the invention, there is limit set on brightness related to eye safety in the projector using laser sources. For example, IEC 60825 has Class 1 that means a safe level for allowing a user to directly see laser for a substantially long time and Class 2 that means a safe level for allowing the user to see laser for a short time, in other words, a safe level if the user avoids the laser immediately after seeing laser.

Standards of the regulations are different according to types of products. Without a warning, it is possible to sell products targeted at Class 1 that are electric appliances including the projector related to the invention. However, products targeted at Class 2 should carry the warning before selling them.

In this instance, a product targeted at Class 1 is adapted to describe the embodiments of the invention in the specification and it is obvious to apply the embodiments of the invention to products targeted at Class 2 in the same or similar way.

When a laser projector satisfies Class 1, there is a limit on a brightness range of 5~10 lm that partially differs according to a system capacity or structure of the laser projector.

There will be described a laser projector capable of solving the limit set on the brightness range, with satisfying Class 1 simultaneously, and a method of processing a signal thereof.

Figure 1:
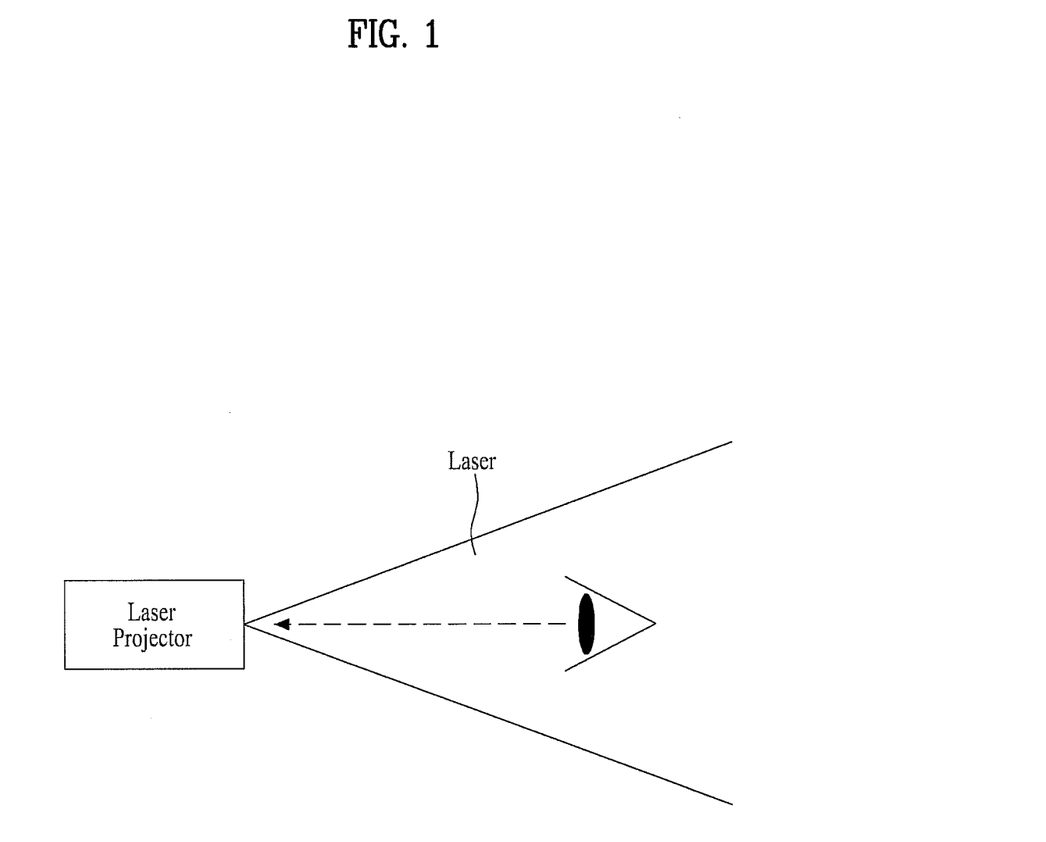
FIG. 1 is a diagram illustrating a laser projecting and eye safety of a conventional laser projector.
Figure 2:
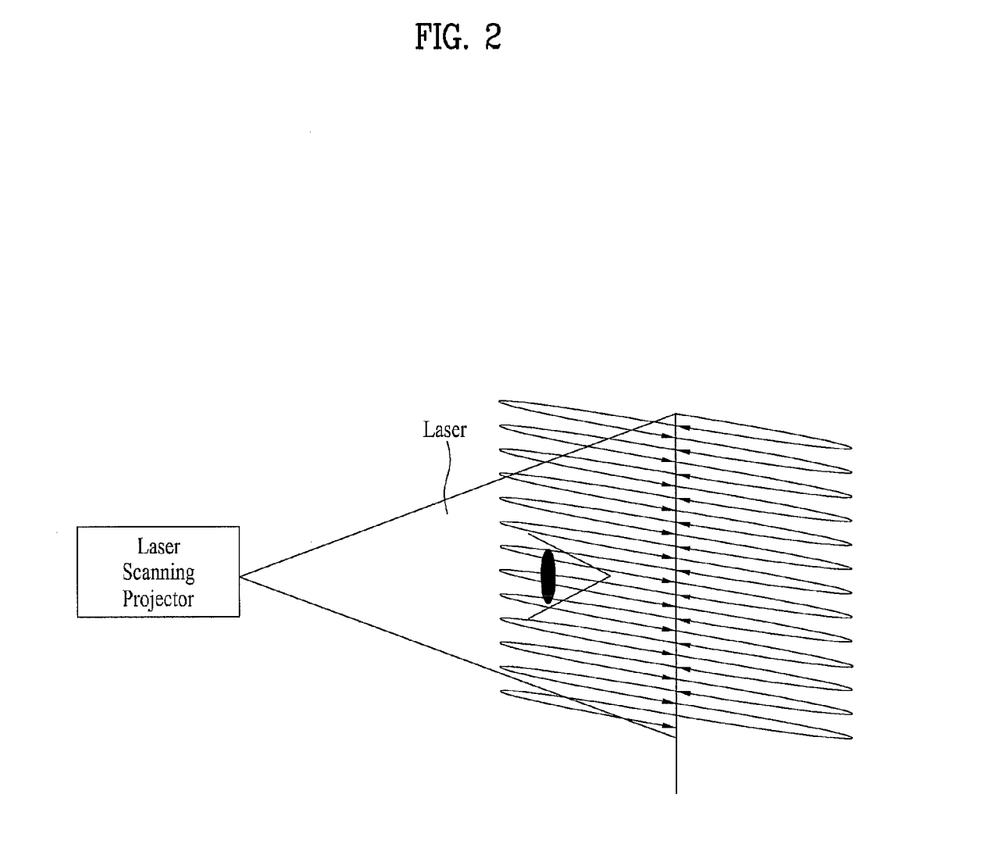
FIG. 2 is a diagram illustrating a laser projecting and eye safety of a scanning type laser projector.
Figure 3:
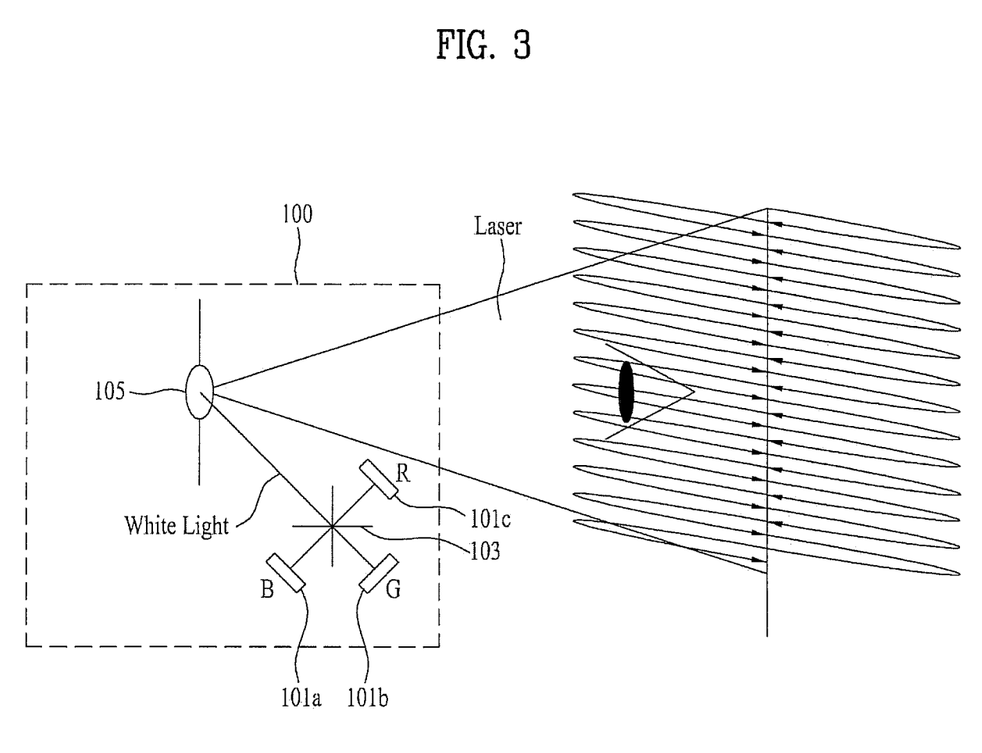
FIG. 3 is a diagram illustrating a method of projecting a laser in the scanning type laser projector shown in FIG. 2.

FIG. 1 is a diagram illustrating laser projecting and eye safety of a conventional laser projector. FIG. 2 is a diagram illustrating laser projecting and eye safety of a scanning type laser projector. FIG. 3 is a diagram illustrating laser projecting of the scanning type laser projector shown in FIG. 2.

FIG. 1 is related to the eye safety in the conventional laser projector and FIG. 2 is related to the eye safety in the scanning type laser projector. Especially, lasers scanned on a screen are sequentially projected from top to bottom in the scanning type laser projector shown in FIG. 2. The scanning type laser projector of FIG. 2 will be embodied to describe the invention as follows. However, the scope of the invention is not limited thereto. As a result, a word of a laser projector may include both of the laser projectors shown in FIGS. 1 and 2, even without special description.

The laser projector projects a laser generated from at least one laser source and it provides an image to a user.

In reference to FIG. 3, the laser projector 100 includes a plurality of laser sources 101a, 101b and 101c configured to generate lasers, an optical combination mirror 103 configured to combine the laser lights incident from the laser light sources and a scanner configured to scan the laser lights incident via the mirror 105.

In this instance, the laser sources 101a, 101b and 101c are a blue laser source (B) 101a for generating a blue laser, a green laser source (G) 101b for generating a green laser and a red laser source (R) 101c for generating a red laser, to describe the invention conveniently. However, the laser sources are partially removed or an auxiliary laser source is added and the invention is not limited thereto.

As mentioned above, the laser generated in each of the laser sources 101a, 101b and 101c is projected on a screen via the scanner. If the user located between the laser projector 100 and the screen sees the projected laser, the eye safety mentioned above might be generated as shown in FIGS. 1 to 3.

Figure 4:
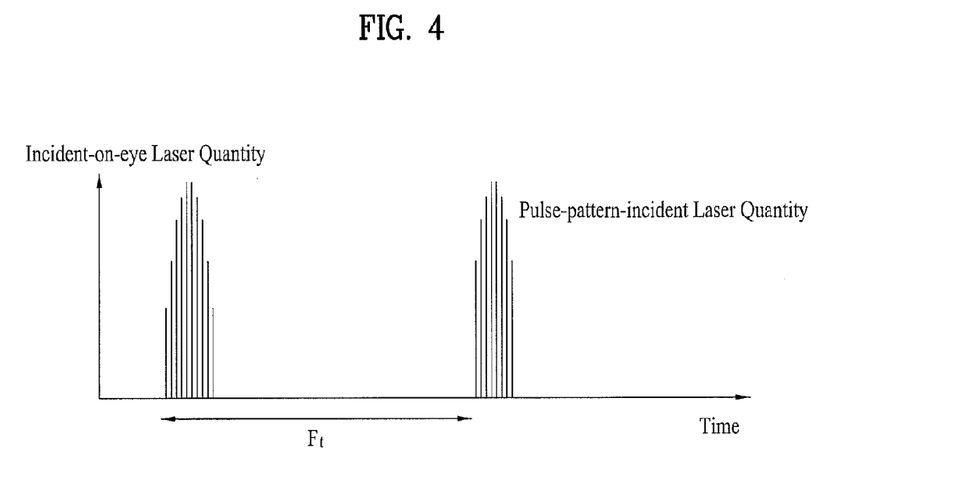
FIG. 4 is a diagram illustrating an embodiment of the quantity of the lasers incident on a user's eyes after projected from the laser projector according to the time.
Figure 5:
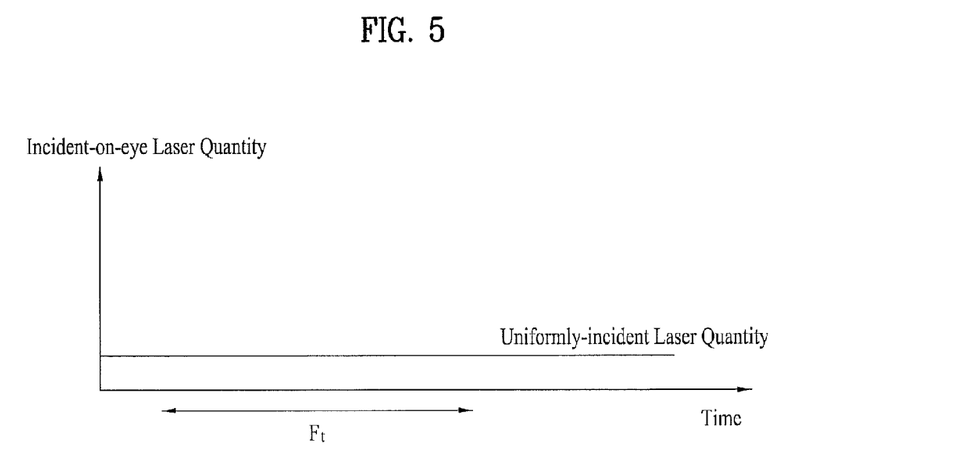
FIG. 5 is a diagram illustrating another embodiment of FIG. 4.

FIG. 4 is a diagram illustrating an embodiment of the quantity of the lasers incident on a user's eyes after projected from the laser projector according to the time. FIG. 5 is a diagram illustrating another embodiment of FIG. 4.

In FIGS. 4 and 5, a horizontal axis means a time axis and a vertical axis means the quantity of the lasers incident on the user's eyes.

It is shown in FIG. 4 that each laser projected from the scanning type laser projector shown in FIG. 3 is incident on the user's eyes at a preset time interval, like pulses.

The time taken for the laser to return to an original position after projected from the laser projector according to the scanning method may be defined as a frame time ($F_t$). Such a frame time ($F_t$) may be variously embodied to be 1/30 to 1/1000 second, generally 1/60 second.

However, it is shown in FIG. 5 that the laser projected from the laser projector is incident on the user's eyes uniformly, different from the pulse type of FIG. 4.

In reference to IEC 60825, the quantity of the lasers incident uniformly satisfies Class 1 even in a higher brightness during the frame time ($F_t$), compared with the quantity of the lasers incident in the pulse type of FIG. 4.

As a result, if the quantity of the lasers projected from the laser projector is uniform, the standards provided for the eye safety may be satisfied and the brightness limited by the standards may be improved simultaneously.

Invented from this, embodiments for enabling the quantity of the lasers projected from the laser projector to be uniform will be described as follows.

It is typical that the quantity of the lasers is integrated in the pulse pattern in the laser projector because the laser projector projects the lasers sequentially according to the scanning process.

For that, the specification discloses that a time difference is generated in the scanning type laser projector when the laser is projected on the screen after scanned by a scanner, to provide the quantity of the lasers projected from the scanning type laser projector as uniformly as possible according to the invention. For that, according to an embodiment, an incident angle of the laser incident on the scanner from each laser source may be controlled. According to another embodiment, the laser is scanned or generated from the scanner or each laser source with a time difference before incident on the scanner. In the embodiment, image convergence may be used to solve the problem of the image distortion which might be generated by the scanning process of projecting the lasers sequentially.

The embodiment of the invention may provide the quantity of the lasers incident on the human eyes located between the laser projector and the screen as uniformly as possible. Accordingly, the limit set on the brightness of the laser projector can be improved more, compared with the laser projector that provides the quantity of the lasers in the pulse type shown in FIG. 4.

Figure 6:
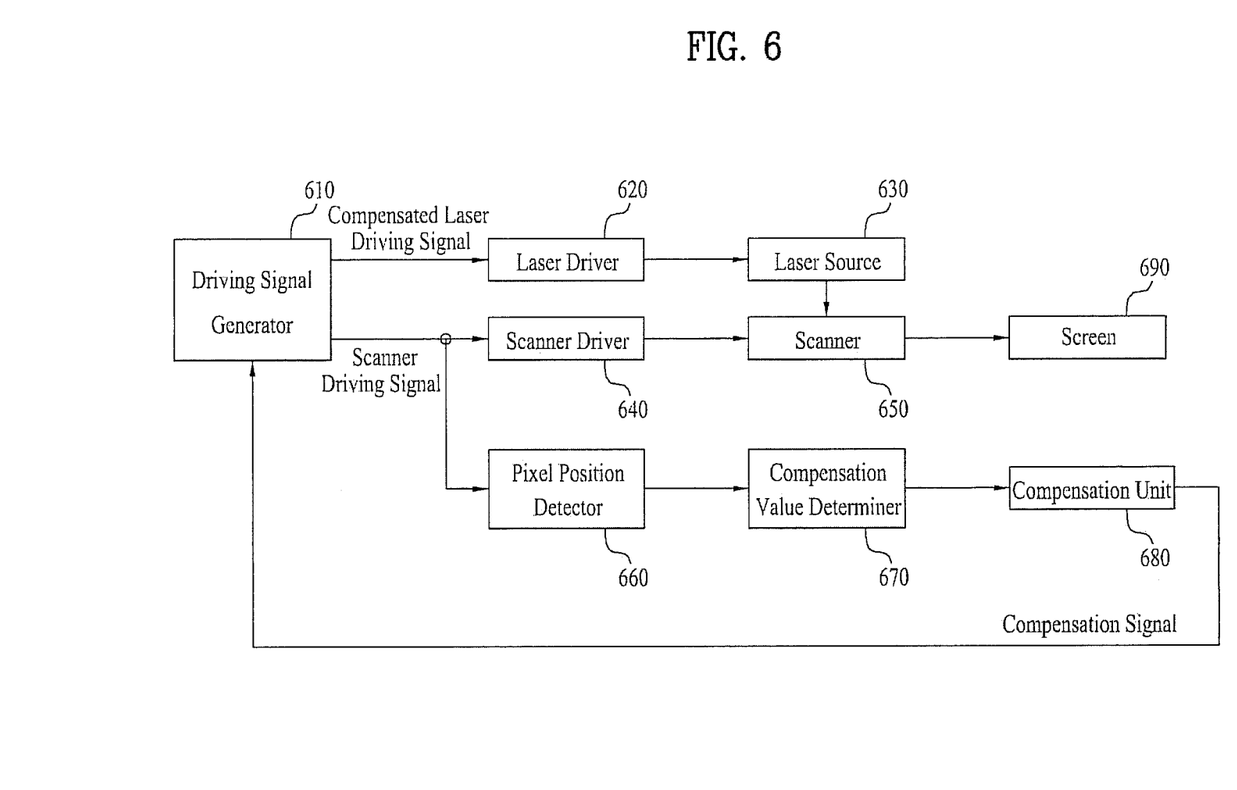
FIG. 6 is a block diagram illustrating an embodiment of the laser projector according to the invention.

FIG. 6 is a block diagram illustrating an embodiment of the laser projector according to the invention.

The embodiment of the laser projector includes a plurality of laser sources 630 configured to generate lasers, a controller configured to control each of the generated lasers to be incident on a specific region on a screen with a preset time difference and a scanner 650 configured to scan each of the lasers on the screen.

In this instance, the laser projector according to the embodiment of the invention may further include a laser driving signal generator 610 configured to generate a laser driving signal for driving the laser sources 630 and a scanner driving signal for driving the scanner 650, and a laser driver 620 and a scanner driver 640 configured to drive the laser sources 630 and the scanner 650 based on the laser driving signal and the scanner driving signal generated by the driving signal generator 610.

In this instance, the driving signal generator 610 receives an image signal input from an image signal output module such as a personal computer (PC) or an audio/video (A/V) system and it then generates the laser driving signal for processing the received image signal and the scanner driving signal for driving the scanner.

The laser sources 630 may generate lasers and the laser sources 630 may include a plurality of various color laser sources such as red, green and blue lasers related to the typical processing of the image signal.

As a result, the laser driving signal generated by the driving signal generator 610 may include image signals and a horizontal synchronizing signal and a vertical synchronizing signal, for the red, green and blue corresponding to the laser.

The driving signal generator 610 may generate the scanner driving signal based on the horizontal synchronizing signal and the vertical synchronizing signal of the generated laser driving signal. In this instance, the generated scanner driving signal may include a horizontal and vertical scanner driving signal.

The laser driver 620 generates a voltage or current for driving the laser source 630 including the red, green and blue laser sources based on the received laser driving signal. The laser source 630 generates the laser at a corresponding level to the voltage or current applied thereto.

The scanner driver 640 may include a sine-wave generating circuit, a triangle-wave generating circuit and a signal synthesizing circuit. The scanner driver 640 generates a driving frequency for driving the scanner 650 based on the received scanner driving signal. The scanner 650 is driven horizontally and vertically based on the horizontal and vertical driving frequency and it then scans the laser on a screen 690, to realize the image on the screen 690.

The scanner 650 receives the lasers input from the laser sources 630, for example, the red laser source (R), the green laser (G) and the blue laser source (B) at different incident angles, respectively. The scanner 650 projects each of the received lasers on the screen 690 according to the scanner driving signal based on the control of the scanner driver 640.

In this instance, the driving speed of the scanner 650 along a horizontal line of an image in a single frame is different from the driving speed along another horizontal line. Accordingly, brightness of the displayed image fails to be uniform.

As a result, the laser projector according to the invention may further include a pixel position detector 660, a compensation value determiner 670 and a compensation unit 680. In this instance, the laser projector according to the invention may compensate the laser driving signal generated by the driving signal generator 610 and it may correct the brightness of the output image more uniformly under the same condition.

The pixel position determiner 660 detects a position of a pixel corresponding to a single frame from the generated scanner driving signal. In other words, the pixel position detector 660 may detect a current pixel position of the image desired to display on the screen 690.

The compensation value determiner 680 determines a brightness compensation value corresponding to the detected pixel.

The compensation unit 680 may generate a compensation signal for compensating a laser driving signal corresponding to the detected pixel based on the determined brightness compensation value, to increase or decrease the brightness compensation value gradually toward pixels getting distant from at least one preset reference pixel out of entire pixels corresponding to each horizontal line of the single frame.

The compensation signal generated by the compensation unit 680 is output to the driving signal generator 610 and the driving signal generator 610 generates the laser driving signal compensated by the input compensation signal.

The laser driver 620 drives the laser sources 630 based on the compensated laser driving signal, such that it may generate the compensated lasers.

Hence, the scanner 650 scans the compensated lasers on the screen 690 and it may provide the image having the uniform brightness of which brightness distortion generated by the speed variation of the scanner 650 is compensated.

Figure 7:
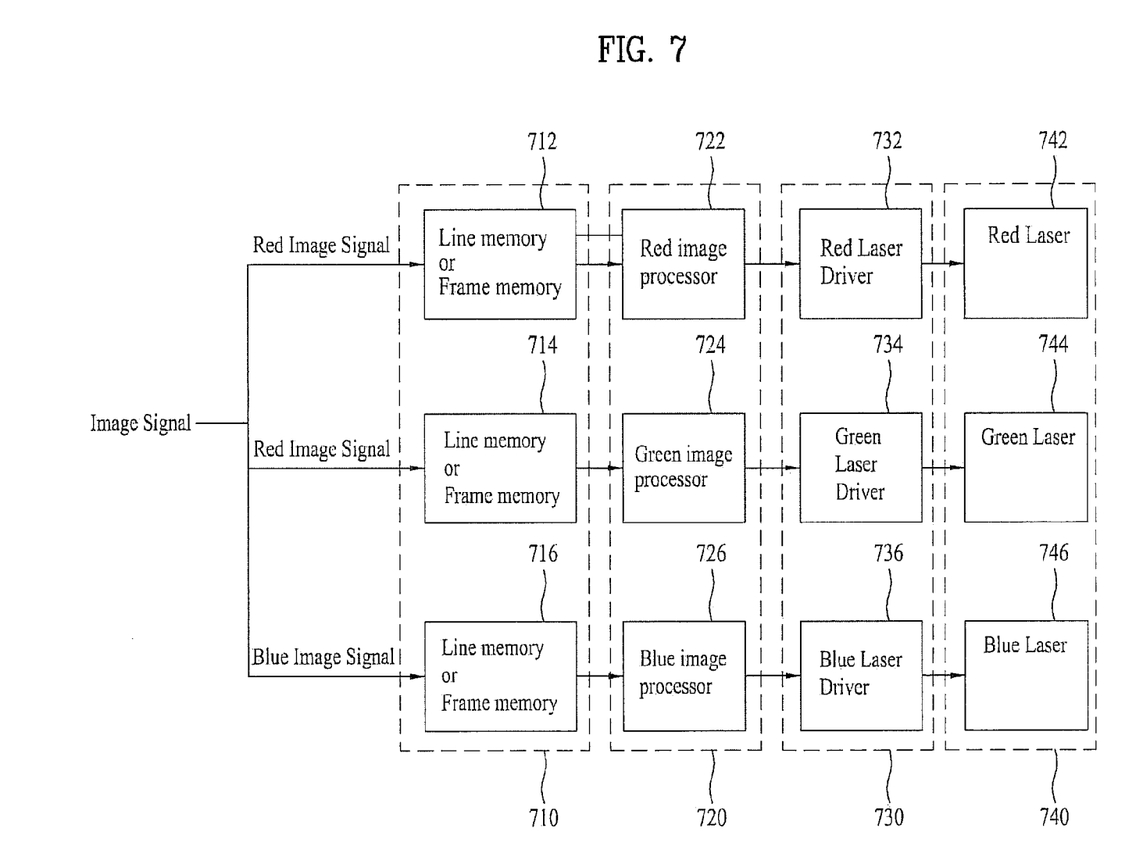
FIG. 7 is a block diagram illustrating detailed operations of a laser driver and a laser source provided in the laser protector according to the invention.

FIG. 7 is a block diagram illustrating detailed operation of the laser driver 620 and the laser sources 630 provided in the laser projector according to the invention.

In reference to FIG. 7, the laser projector separates an image signal corresponding to each laser source from the input image signal and it projects each of the separated image signals via the corresponding laser source 740.

In this instance, the separated image signals are projected on the screen at preset time intervals which will be described later. For image convergence to solve the problem of the image distortion which might be generated by the time intervals, the image signals are temporarily stored in a line memory or frame memory 710 for the laser sources.

The image signal temporarily stored in the line or frame memory 710 is processed in a corresponding image processor 720 to be an image which will be output from the laser projector. the laser sources 740 generates a laser corresponding to the processed image via the laser driver 730 for driving the laser source based on the laser driving signal generated by the driving signal generator 610 mentioned above.

The generated lasers of the laser sources are projected to specific regions on the screen to generate a preset time interval, respectively, and the quantity of the lasers incident on the specific regions may be as uniform as possible.

For that, in the specification as mentioned above, the preset time difference among the lasers projected on the specific regions of the screen may be generated. To generate the time difference, a method of controlling an angle between each of the laser sources and the scanner will be described as follows. In this instance, the angle may mean a laser incident angle between each of the laser sources and the scanner or a separation angle between two neighboring laser sources.

Figure 8:
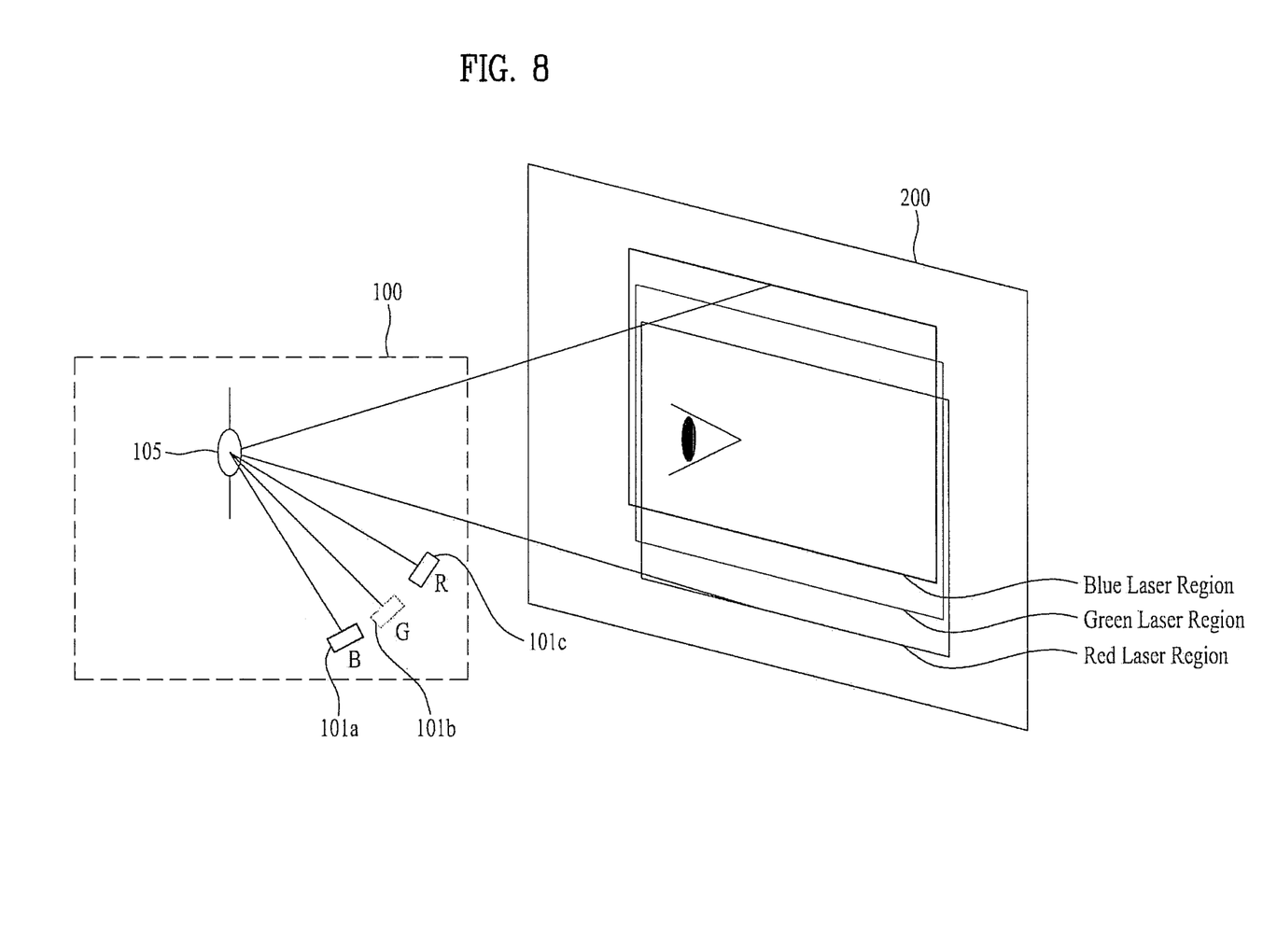
FIG. 8 is a diagram illustrating a method of controlling an angle between a scanner and each laser source according to an embodiment.
Figure 9:
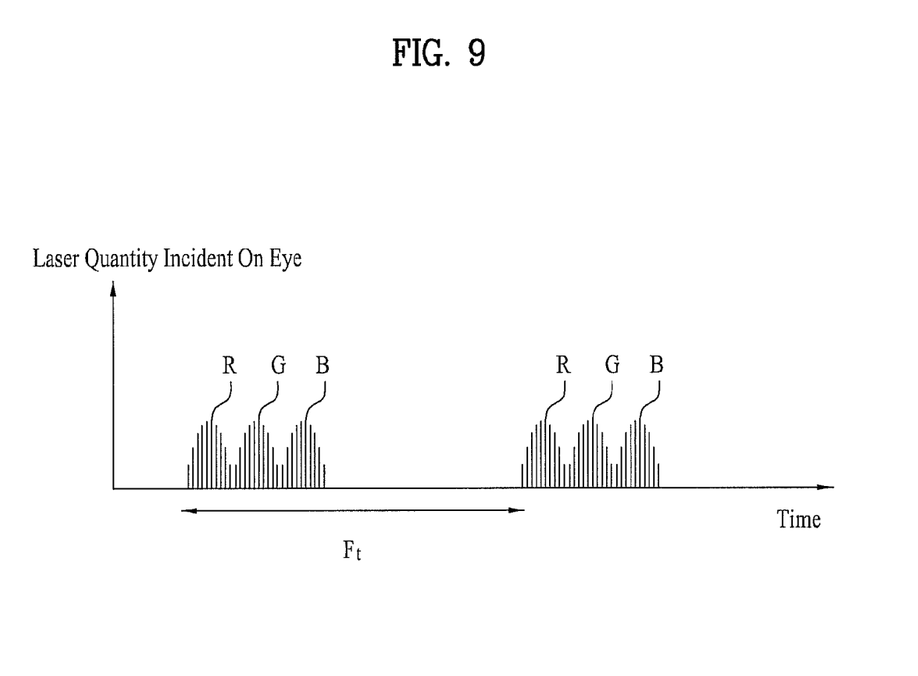
FIG. 9 is a diagram illustrating the quantity of incident lasers according to the embodiment of FIG. 8, compared with FIG. 4.

FIG. 8 is a diagram illustrating a method of controlling an angle between the scanner and each of the laser sources according to an embodiment of the invention. FIG. 9 is a diagram illustrating the quantity of lasers according to the embodiment of FIG. 8, compared with FIG. 4.

In reference to FIG. 8, a laser generated in each of laser sources 101a, 101b and 101c is directly incident on a scanner 105 in a laser projector 100 according to this embodiment of the invention, without the mirror shown in FIG. 3. This is because the control of the angle is meaningless if the mirror is used.

In reference to FIG. 8, the lasers generated in the laser projector are projected to different regions on a screen 200, respectively.

As a result, the projected lasers projected sequentially are incident on specific regions of the screen 200, for example a region in which a human eye is located, at a preset time interval.

Accordingly, as shown in FIG. 8 different from FIG. 4, R, G and B lasers are incident on a specific region at a differential time and the peak incident laser quantity is decreased and the time is increased in contrast.

For example, in FIG. 8, an angle between each of the laser source 101a, 101b and 101c and the scanner 105 is controlled and the peak incident laser quantity is decreased by one third and the incident time or the incident laser quantity is increased three times.

The laser projector according to the invention may improve the brightness 2 to 2.5 times and satisfy the regulations for eye safety simultaneously, compared with the laser projector shown in FIG. 3.

Figure 10:
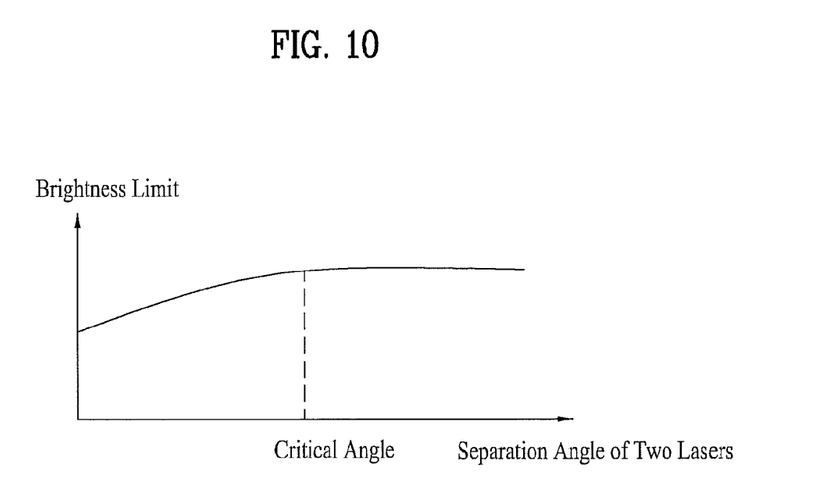
FIG. 10 shows the effect of improving the brightness at a preset angle, for example, a critical angle or more is not increased remarkably based on the standards for eye safety.

To avoid overlapping of the lasers having the angles with the scanner to be separated from each other on a specific region, a proper angle control is required. For example, if a separation angle between the scanner 105 and two neighboring lasers is too narrow, the quantity of lasers might fail to be uniform and the effect of improving the brightness might be less effective. The effect of improving the brightness at a preset angle, for example, a critical angle or more as shown in FIG. 10 is not increased remarkably based on the standards for eye safety. To improve the brightness at less than the critical angle, a proper angle has to be selected and angle control according to the selection is required.

If the critical angle or more is selected and controlled, image distortion might be severe and the image fails to be identified and the user might be inconvenienced.

According to IEC 60825, safety regulations are provided based on the size of a pupil and the focal distance of an eyeball. Based on IEC 60825, the eyes are safe when a distance from a laser emitted point, for example, the scanner 105 to a specific region, for example, the eye is 100 mm, with 7 mm of the pupil size.

Based on the standards of IEC 60825, the critical angle that is a separation angle between two neighboring lasers may be an arc tangent (A tan(7/100)). Accordingly, the separation angle is set less than the critical angle of A tan(7/100). Preferably, the separation angle may be selected properly within a range of A tan(0.01)/100 to 2*(A tan(0.07)) in consideration of the performance and structure of the system.

Figure 11:
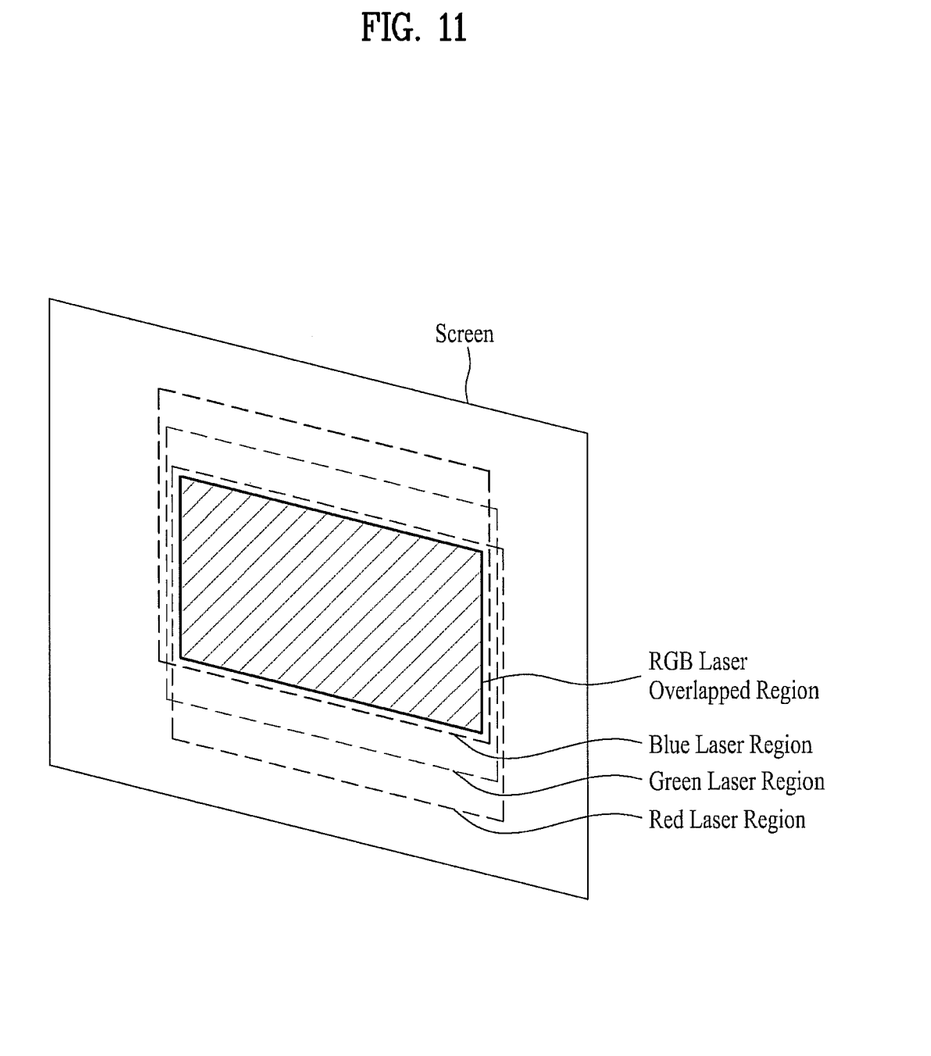
FIG. 11 is a diagram illustrating image distortion that might be generated when the incident angle is controlled according to the invention and a method of improving the image distortion.
Figure 12:
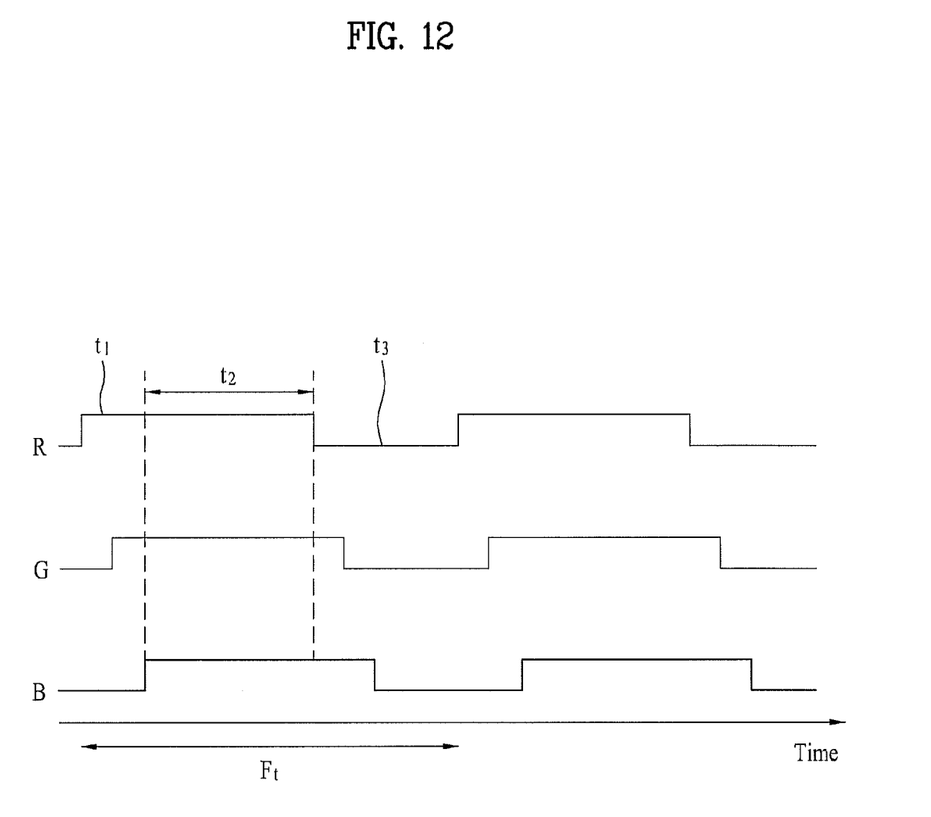
FIG. 12 is a diagram illustrating a method of controlling an active time for image convergence according to the invention.
Figure 13:
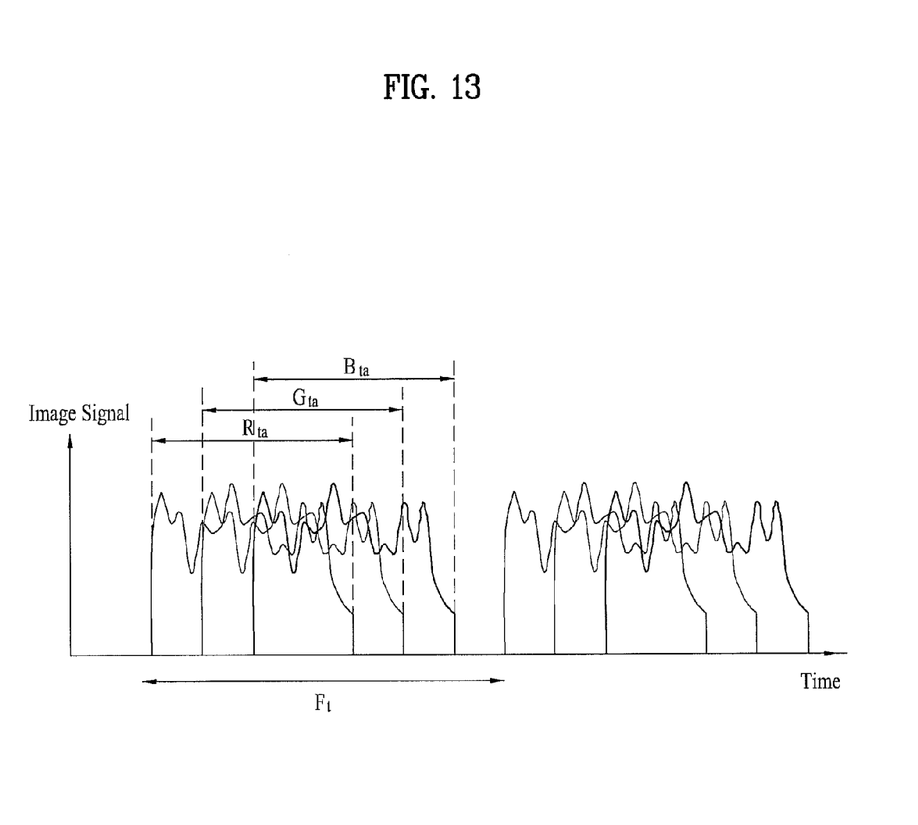
FIG. 13 is an example of a real image signal according to the active time of FIG. 12.

FIG. 11 is a diagram illustrating image distortion that might be generated, when the incident angle is controlled according to the invention, and a method of improving the image distortion. FIG. 12 is a diagram illustrating a method of controlling an active time (or period) for image merge according to the invention. FIG. 13 is an example of actual image signals according to the active time of FIG. 12.

When the incident angle is controlled according to the invention as shown in FIG. 11, the regions converted by the lasers are different and the image on the screen may be distorted.

In other words, a distortion degree of the image is determined by the incident angle. As the time difference of the lasers incident on the specific region of the screen is getting larger, in other words, the incident angle is getting larger, the distortion of the image may be getting severer. If the incident angle is small, image convergence needs not be performed which will be described later.

In FIG. 11, the regions in which the lasers are projected on the screen are overlapped with a region in which three lasers are projected on the screen.

The image convergence is performed to output the image only on the overlapped region except a unique region of each laser, to remove the image distortion. In this instance, the size of the region where the real image is outputted may be determined based on the size of the overlapped region. Accordingly, when the size and brightness of the real output image is selected appropriately, the brightness can be improved and loss of the output image size may be reduced as much as possible. The unique region of the laser is a terminology selected to distinguish the region covered by each of the lasers from the overlapped region of all the lasers.

For the image convergence mentioned above, the invention may use a method of controlling an active time according to an embodiment as shown in FIG. 12.

In this instance, an active time ($t_1$) means the time taken to transmit a real image signal to a corresponding laser in the frame time mentioned above. The time taken to transmit not real image signal to the laser projected on the screen in the frame time means a blank time ($t_2$).

According to a basic concept of the embodiment, the active time of each laser projected sequentially is controlled differently to output the image only on the overlapped region mentioned above.

For example, in reference to FIG. 11, a blue laser region starts from a top of the screen, and then a green laser region and a red laser region start.

Accordingly, as shown in FIG. 12, the active time of the red laser meeting the overlapped region first may start first under the assumption that the sequential projecting speed of each laser is the same. After that, the active time of the red laser may be controlled to start sequentially and the active time of the blue laser may be controlled to start lastly. Accordingly, the real image signal of each laser projected to the overlapped region is converged and the image distortion is removed.

In other words, a start time of the active period of the laser scanned on the screen earliest may be controlled to be the last and a start time of the active time of the laser scanned last may be controlled to be the earliest.

It is assumed above that the sequential projecting speed of each laser is the same. However, while the active time is the same, the sequential projecting speed of each laser is controlled properly like the above embodiment. The identical or similar effect may be achieved. In other words, the sequential projecting speed of the laser projected on an uppermost region of the screen is controlled to be the earliest and the sequential projecting speed of the laser projected on a lowermost region of the screen is controlled to be the last. In this instance, the sequential projecting speed of each laser is controlled to be the same in the overlapped region or the image signal is controlled differentially based on the sequential projecting speed controlled differentially.

Also, the controller may control the size of the image on the screen based on the separation angle and the active time of each laser. The controller may control the output image by a preset unit and the preset unit may include a frame unit.

The invention mentioned above embodies the method of controlling the separation angle of each laser. According to another embodiment rather than this, at least one of the laser sources and scanner is controlled to generate the time difference among the lasers incident on the screen, while the separation angle is not controlled differentially but controlled identically. Even in this instance, if the active time is controlled properly, the image distortion may be prevented and the brightness may be improved without size loss of the real image. A method of embodying this may be similar to the method mentioned above.

Figure 14:
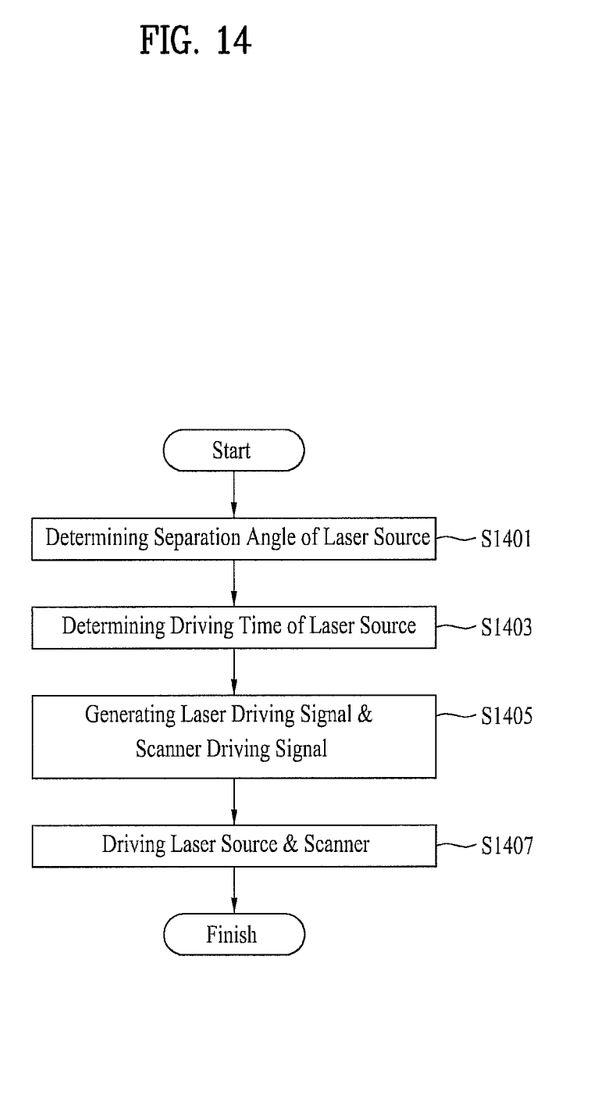
FIG. 14 is a flow chart illustrating an embodiment of a method of processing a signal in the laser protector according to the invention.

FIG. 14 is a flow chart illustrating an embodiment of a method of processing a signal of the laser projector according to the invention.

The embodiment of the method of processing the signal in the laser projector includes (a) of generating lasers in a plurality of laser sources, respectively, and (b) of scanning the lasers generated in the laser sources on a screen. The (b) step includes a controlling step of controlling each laser to be incident on a specific region of a screen with a (preset) time difference.

For signal processing in the laser projector according to the invention, a separation angle of each laser source is determined (S1401) and the driving time of each laser source is determined based on the separation angle of each laser source (S1403).

After that, a laser driving signal for each laser source is generated based on the determined separation angle and driving time and a scanner driving signal is generated (S1405).

Based on the generate laser driving signal, a laser including a image signal incident from each laser source is incident to the scanner and the laser is projected on the screen by the scanner based on the scanner driving signal (S1407).

In this instance, the controlling step may control the separation angle of each laser source differentially to generate the (preset) time difference generated in the projecting of the lasers.

The controlling step may determine the separation angle of each laser source at which the quantity of the scanned lasers in a preset period is the largest. Also, the separation angle of each laser source is a laser projecting angle between two neighboring laser sources with respect to the scanner comprising a range of (A tan t (0.07))/10 to (A tan(0.07))*2. The step of (b) may further include a step of controlling each scanned laser to output a real image only to an overlapped region on the screen. Also, the image output controlling step may control an active period corresponding to the overlapped region differentially based on the separation angle of each laser source. The image output controlling step may control a start time of the active period of the laser scanned on the screen earliest to be the last and a start time of the active period of the laser scanned last to be the earliest. The image output controlling step may control the size of the image scanned on the screen based on the separation angle of each laser source and the active time. The image output controlling step may control the output image by a preset unit (or period) of the output image and the preset unit may include a frame unit (or period).

In addition, the step of (b) may further include a step of temporarily storing an image signal for a corresponding laser based on the active time (or period) and a step of processing the image signal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment.

Further, when a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laser projector comprising:
a plurality of laser sources configured to generate lasers, each of the generated lasers has a different wavelength region from each other;
a controller configured to differentially control a separation angle of each laser source to enable each of the generated lasers to be incident on a specific region of a screen at a different time from each other; and
a scanner configured to scan each of the lasers on the screen, wherein each of the generated lasers is directly incident on the scanner from a corresponding one of the plurality of the laser sources, and wherein the controller differentially controls an active period corresponding to an overlapped region based on the separation angle of each laser source.

2. The laser projector according to claim 1, wherein the controller determines a separation angle of each laser source at which the quantity of scanned lasers is the largest in a preset period.

3. The laser projector according to claim 1, wherein the controller controls a laser projecting angle between two neighboring laser sources with respect to the scanner to be in a range of (A tan(0.07)/10 to (A tan(0.07))*2.

4. The laser projector according to claim 1, wherein the controller controls each scanned laser to be output only to a real image only to the overlapped region on a screen.

5. The laser projector according to claim 1, wherein the controller controls a start time of the active period of the laser scanned on the screen earliest to be a last time and a start time of the active period of the laser scanned last to be the earliest.

6. The laser projector according to claim 1, wherein the controller controls the size of an image on the screen based on the separation angle of each laser source and the active period.

7. The laser projector according to claim 1, wherein the controller controls the output image by a preset period, and the preset period comprises a frame period.

8. The laser projector according to claim 1, further comprising:
a memory configured to store an image signal for a corresponding laser based on the active period; and
an image processor configured to process the image signal.

9. A method of processing a signal of a laser projector comprising:
(a) generating lasers in a plurality of laser sources, each of the generated lasers has a different wavelength region from each other; and
(b) scanning, using a scanner, a laser generated in each laser source on a screen,
wherein the scanning of the laser includes differentially controlling a separation angle of each laser source to enable each of the generated lasers to be incident on a specific region on the screen at a different time from each other, and controlling an active period corresponding to an overlapped region differentially based on the separation angle of each laser source,
wherein each of the generated lasers is directly incident on the scanner from each of the plurality of the laser sources.

10. The method according to claim 9, wherein the controlling of each laser includes determining a separation angle of each laser source at which the quantity of lasers scanned in a preset period is the largest.

11. The method according to claim 9, wherein the separation angle of each laser source is a laser projecting angle between two neighboring laser sources with respect to the scanner comprising a range of (A tan(0.07))/10 to (A tan (0.07))*2.

12. The method according to claim 9, wherein the scanning of the laser includes controlling each scanned laser to output a real image only to the overlapped region on the screen.

13. The method according to claim 9, wherein the scanning of the laser includes controlling a start time of the active period of the laser scanned on the screen earliest to be a last time and a start time of the active period of the laser scanned last to be the earliest.

14. The method according to claim 9, wherein the scanning of the laser includes controlling a size of the image scanned on the screen based on the separation angle of each laser source and the active period.

15. The method according to claim 9, wherein the scanning of the laser includes controlling an output image by a preset period of the output image, and the preset period comprises a frame period.

16. The method according to claim 9, wherein the scanning of the laser includes:
temporarily storing an image signal for a corresponding laser based on the active period; and
processing the image signal.

* * * * *